Patented Aug. 31, 1926.

1,598,303

UNITED STATES PATENT OFFICE.

MORRIS PALEY, OF CHARLESTON, WEST VIRGINIA.

SULPHUR BLACK AND SIMILAR SULPHUR DYES.

No Drawing. Application filed May 19, 1923, Serial No. 640,228. Renewed January 27, 1926.

In the manufacture of sulphur black and other sulphur dies, it is essential that the dye shall have as high a tinctorial power as is possible, thereby enabling the manufacturer to use larger amounts of diluent and consequently increase the yield obtained from definite amounts of raw materials.

The objects of my invention are therefore, to produce sulphur dyes, particularly sulphur black, which shall have a greater tinctorial power than has heretofore been available in the art of manufacturing dyes, which naturally will permit a greater yield of dye from definite amounts of the ingredients used in making it, than has heretofore been possible.

The attainment of these objects of my invention not only permits a reduction in the cost of production but also improves the tint produced.

For a detailed description of one example of the manner of carrying out my invention the following method is set forth:

Sodium dinitro-phenolate is thionated with a polysulphide obtained by the use of sodium sulphide, flowers of sulphur and crude sulphur of approximately 99.5% pure sulphur, which latter is sometimes referred to as "brimstone". The latter two forms of sulphur may be either mixed together or added to the phenolate separately. As an alternative two separate polysulphides may be obtained from individual quantities of flowers of sulphur and of crude sulphur, respectively. In the latter case the polysulphide obtained from the flowers of sulphur is mixed with that obtained from the crude sulphur to obtain the desired result, as will be more specifically set forth hereafter.

I am aware that polysulphides of flowers of sulphur have heretofore been used in the manufacture of sulphur dyes which have a reddish tint and that polysulphides of crude sulphur have been used for dyes which have a greenish tint, but to the best of my knowledge and belief these two types of polysulphides or the two forms of sulphur from which they are made have never been combined to form ingredients or elements of the process of making sulphur dyes, particularly sulphur black.

In other words, I have discovered that by combining the effects of two types of sulphur such as flowers of sulphur with those of crude sulphur, which usually have freezing points of about 107° C. and 115° C. respectively, an increased yield of about 20% of sulphur black is obtained from the same amount of raw materials as heretofore and the tinctorial power is also greatly increased. These facts consequently reduce the cost of production to a material extent and also give an improved tinctorial effect.

I have not been able to determine that the improved action resulting from combining various types of sulphur can be attributed to any particular impurity or impurities, nor have I been able to fix a definite theory upon which the action of the different types of sulphur may be based. The impurities, regardless of their nature, which affect the freezing point, are doubtless factors in producing the results obtained and the difference in alotropic forms also affect the results. As shown by the literature relating to sulphur, it is apparent that questions of time, temperature, pressure and the rate of cooling during the melting of sulphur in preparation for commercial use also affect the freezing point of sulphur, or its alotropic state, and determine the amounts of the soluble or insoluble gamma sulphur formed. These considerations must therefore be borne in mind in connection with the following description of the present process of producing sulphur black dye.

In the production of my improved sulphur black I prefer to thionate a suitable intermediate, such as sodium dinitro-phenolate with a polysulphide which consists of 69.2 per cent of sodium sulphide ($Na_2S_{4.5}$) crystals or 34.6 per cent of fused sodium sulphide, 27.7 per cent of flowers of sulphur and 3.1 per cent of crude sulphur. I intend to include such other intermediates as are known in the art of manufacturing sulphur dyes, and these include such intermediates as indophenols used in connection with the manufacture of sulphur blue dyes and also phenazine used in the manufacture of sulphur red-brown dyes. I have mentioned the production of sulphur black dyes especially because these are generally manufactured in larger quantities owing to the greater use of black dyes than dyes of other tints. The total amount of sulphur may be somewhat greater or less than that indicated if it be desired to produce polysulphides having a higher or a lower sulphur content than $Na_2S_{4.5}$ but the ratio between the flowers of sulphur and the crude sulphur should be about the stated or approximately 9:1, but the said ratio under certain conditions may be made considerably greater. Wherever the term "flowers of sulphur" have been mentioned in this specification and in the claims, I desire it to be understood that said term may comprehend or include certain grades of sulphur known as "flour sulphur" which may be used instead of the former grade of sulphur.

In the manufacture of sulphur blues and other sulphur dyes, the ratio will have to be changed accordingly to produce the desired tint. The subsequent steps in the process of making sulphur dyes will be fully understood by those skilled in the art relating to the same.

Broadly, my invention therefore, comprises the use of flowers of sulphur and crude sulphur in a suitable ratio to increase the tinctorial power of sulphur dyes and particularly black dyes, and I do not wish to be understood as being limited to the specific quantities of materials set forth or to the details of the manner of using them, for various changes may be made by those skilled in the art without departing from the spirit and scope of my invention.

What I claim and desire to protect by Letters Patent is:

1. Sulphur dyes comprising a sulphur product obtained from the thionation of an intermediate usually employed in producing such dyes with flowers of sulphur and crude sulphur.

2. Sulphur dyes comprising a sulphur product obtained from the thionation of an intermediate usually employed in producing such dyes, with two types of powdered sulphur having different freezing points.

3. Sulphur dyes comprising a sulphur product obtained from the thionation of an intermediate usually employed in producing such dyes, with two types of powdered sulphur, one of which has a freezing point of about 115° C. and the other a freezing point substantially less than the former.

4. The step in the process of making sulphur dyes which comprises thionating an intermediate usually employed in producing the same with flowers of sulphur and crude sulphur.

5. The step in the process of making sulphur dyes which comprises thionating an intermediate usually employed in producing such dyes, with two types of powdered sulphur having different freezing points.

6. The step in the process of making sulphur dyes which comprises thionating an intermediate usually employed in producing such dyes, with two types of powdered sulphur, one of which has a freezing point of about 115° C. and the other a freezing point substantially less than the former.

7. The step in the process of making sulphur black which comprises thionating sodium dinitrophenolate with two types of powdered sulphur, one of which has a freezing point of about 115° C. and the other a freezing point substantially less than the former.

Signed at New York, N. Y. May 18, 1923.

MORRIS PALEY.